United States Patent [19]

Bar-Lev et al.

[11] Patent Number: 5,191,442
[45] Date of Patent: Mar. 2, 1993

[54] APPARATUS FOR SCANNING A DOCUMENT

[75] Inventors: Assa Bar-Lev, Chestnut Hill; Bryan Corrigan, Framingham, both of Mass.; Daniel A. Ferrara, Jr., Bantam, Conn.; Robert Sengstaken, Hollis, N.H.

[73] Assignee: ECRM, Tewksbury, Mass.

[21] Appl. No.: 515,742

[22] Filed: Apr. 26, 1990

[51] Int. Cl.⁵ ............................................. G06K 9/20
[52] U.S. Cl. .................................. 358/453; 355/202; 355/234
[58] Field of Search ................ 355/76, 202, 234, 73; 358/295, 453, 488, 496; 382/48, 65, 61; 178/18, 19

[56] References Cited

U.S. PATENT DOCUMENTS

| | | |
|---|---|---|
| 3,467,524 | 9/1969 | Gruver . |
| 3,551,048 | 12/1970 | Hoffman ........................... 355/76 |
| 4,251,153 | 2/1981 | Levine . |
| 4,268,164 | 5/1981 | Yajima et al. ..................... 355/202 |
| 4,285,012 | 8/1981 | Ohara et al. ..................... 358/496 |
| 4,299,478 | 11/1981 | Knodt et al. . |
| 4,586,815 | 5/1986 | Hoshino et al. . |
| 4,596,456 | 6/1986 | Ide ..................................... 355/234 |
| 4,676,582 | 1/1987 | Kato et al. . |
| 4,683,156 | 6/1987 | Horikawa et al. . |
| 4,734,789 | 3/1988 | Smith et al. . |
| 4,745,491 | 2/1989 | Kishi et al. . |
| 4,771,336 | 9/1988 | Ohtorii ............................. 358/452 |
| 4,805,973 | 3/1989 | Watanabe . |
| 4,812,874 | 3/1989 | Kubota et al. . |
| 4,812,875 | 3/1989 | Tanimoto . |
| 4,816,921 | 3/1989 | Akiyama et al. ................. 358/488 |
| 4,849,787 | 7/1989 | Honjo et al. . |
| 4,849,914 | 7/1989 | Medioni et al. ................... 358/456 |
| 4,875,075 | 10/1989 | Sootome et al. . |
| 4,958,241 | 9/1990 | Ohtomo et al. ................... 358/496 |
| 4,965,678 | 10/1990 | Yamada ............................. 382/48 |
| 4,985,778 | 1/1991 | Ayata et al. ....................... 355/202 |
| 4,992,828 | 2/1991 | Liston ................................. 355/202 |

Primary Examiner—Leo H. Boudreau
Assistant Examiner—David Fox
Attorney, Agent, or Firm—Hale and Dorr

[57] ABSTRACT

An apparatus for scanning documents combines digitizing circuitry with a scanning platen to achieve precise selection of image areas on large documents. A vacuum system holds the document in place against a perforated scanning surface during registration and scanning. The assembly of scanning surface, vacuum chamber, and digitizing circuitry move as a unit beneath a fixed scanning apparatus. The apparatus further has a mechanical structure which allows the table assembly to rotate about a pivot axis toward an operator to reduce parallax error in mapping image areas.

2 Claims, 4 Drawing Sheets

APPARATUS FOR SCANNING A DOCUMENT

BACKGROUND OF THE INVENTION

The invention relates generally to scanning documents and in particular, to apparatus for scanning selected portions of large documents.

Various systems have been used for selecting portions of a document to be scanned. According to one approach, the original document is placed on a digitizer pad where the area to be scanned is mapped by an operator using, for example, a cross-hairs device to define coordinates of selected boundaries, and the coordinates are entered into a computer through the digitizing mechanism. The document is then transferred to a scanning table, using a known registration, and the stored coordinates are recalled. As the document is scanned, only the area within the designated boundaries is recorded, while the area outside the designated boundaries is excluded.

Errors often occur in this procedure as the original document is transferred from the digitizing pad to the scanning table surface. The precise coordinates recorded from the digitizer may not precisely match the scanned area if the document has been placed out of registration on the scanning table, or if the document moves during registration or scanning, for example, because of air currents.

Additionally, since the procedure described above can be used with documents having a width of eighteen inches or more, errors are often made in mapping a selected image area, since an operator may be viewing the far side of a document from an angle as he leans over the digitizer pad. As a result, incorrect coordinates may be selected for the desired image area.

A primary object of the invention is an apparatus which ensures that the precise coordinates chosen on the digitizer pad match the scanned area of the document. Another object of the invention is an apparatus which aids the operator in accurately designating coordinates of the image area to be scanned. Further objects of the invention are a simple, accurate, and reliable scanning apparatus.

SUMMARY OF THE INVENTION

The invention relates to an apparatus which combines digitizing circuitry with a scanning platen in one moving assembly unit. A digitizer is installed beneath the surface of a scanning platen so that a document, once placed on the platen, can be both digitized and scanned without being repositioned. A vacuum chamber is created between the scanning platen and the active digitizer surface, so that the document is held in place through a vacuum at holes on the surface of the platen. The assembly of digitizer, vacuum chamber, and perforated scanning platen move as a unit beneath the fixed scanning apparatus.

In another aspect of the invention, the apparatus features a mechanism for tilting the table on which the scanning optics, scanning platen, and digitizer rest. A linear actuator enables the operator to rotate the table at an angle of up to 20° to thus rotate the document toward him for more precise coordinate selection using, for example, a cross-hairs device.

DESCRIPTION OF A PREFERRED EMBODIMENT

Figure 1:
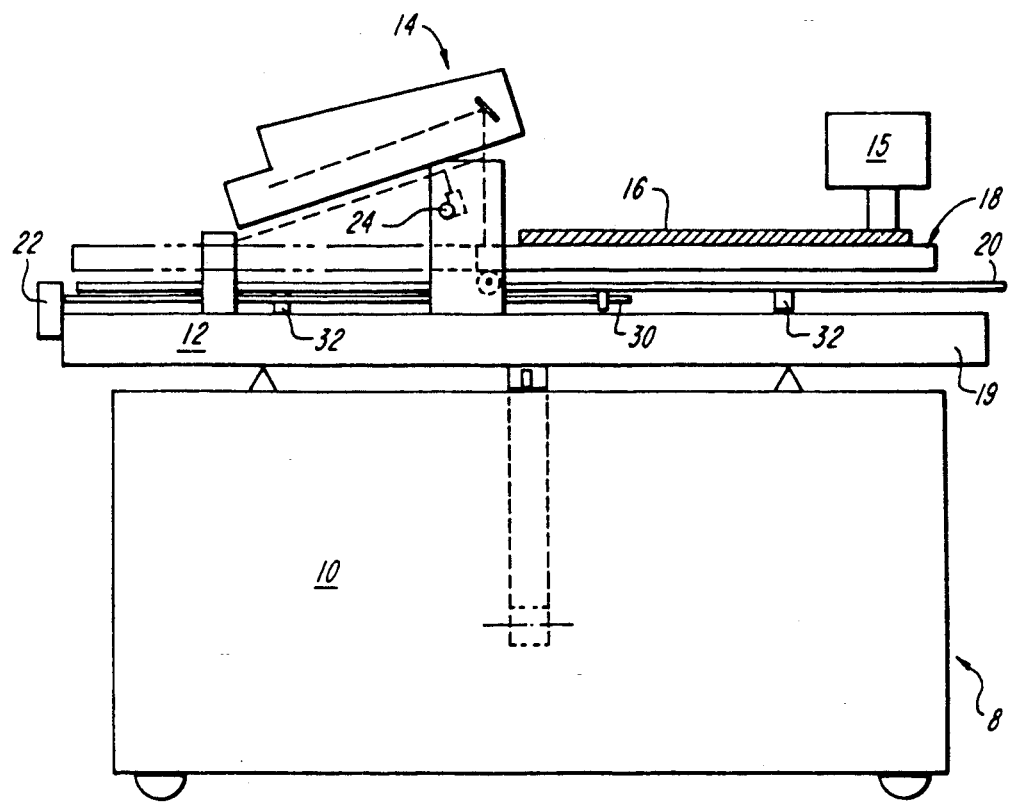
FIG. 1 is a front elevation view showing the overall configuration of a preferred embodiment of the invention.

Referring to FIG. 1, the invention relates to a laser scanning apparatus 8 for effecting precision recording of designated portions of a scanned document 16. The apparatus 8 has a base 10, a table assembly 12, a scanning optics assembly 14, a control console 15, and a moveable platen assembly 18.

In the illustrated embodiment, the document 16 is placed on the moveable platen assembly 18 where coordinates of a selected image area are mapped and stored electronically. The moveable assembly is supported by a table support 19 of table assembly 12 and moves along a guide rail 20, driven by a motor 22 and lead screw 30. The moveable assembly 18 carries the document underneath scanning optics assembly 14. When the document is scanned, the electronically stored coordinates are recalled and only the image area designated by the coordinates is recorded. An elevation mechanism 24 allows the scanning optics of assembly 14 to be adjusted, as is well known in the art, with respect to the thickness of the document being scanned.

Figure 2:
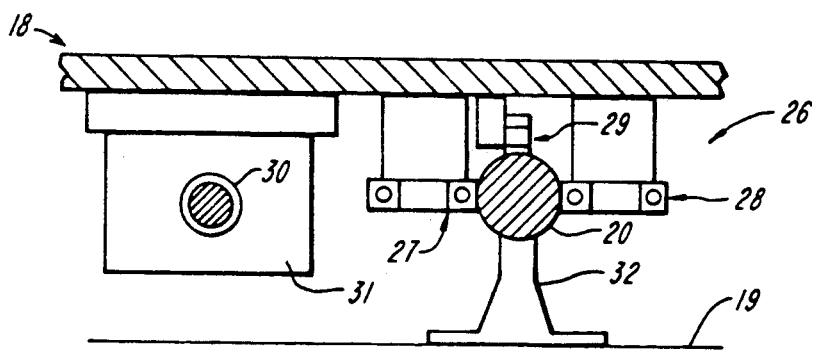
FIG. 2 is a detailed view of the mechanism for moving a document platen assembly beneath a scanning mechanism.

Referring to FIG. 2, the mechanics for moving the document beneath the scanning assembly are shown. The moveable assembly 18 moves along a guide rail structure 26, contact being through bearing assemblies 27, 28, and 29. The assembly rolls along guide rail 20 when the lead screw 30, which passes through a coupling 31, is rotated by drive motor 22. The guide rail is supported by the table support 19 at rail supports 32. The moving assembly contacts the guide rail 20 through bearing assemblies 27, 28 to control horizontal movement and is supported by guide rail 20 through bearing assembly 29 to fix the vertical position.

Figure 3:
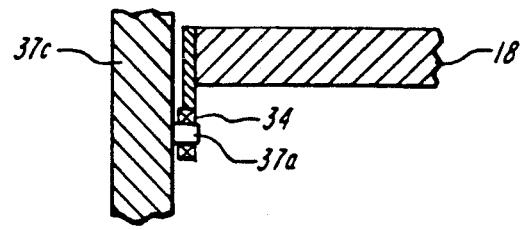
FIG. 3 is a detailed view of the support mechanism for the document platen assembly.
Figure 1A:
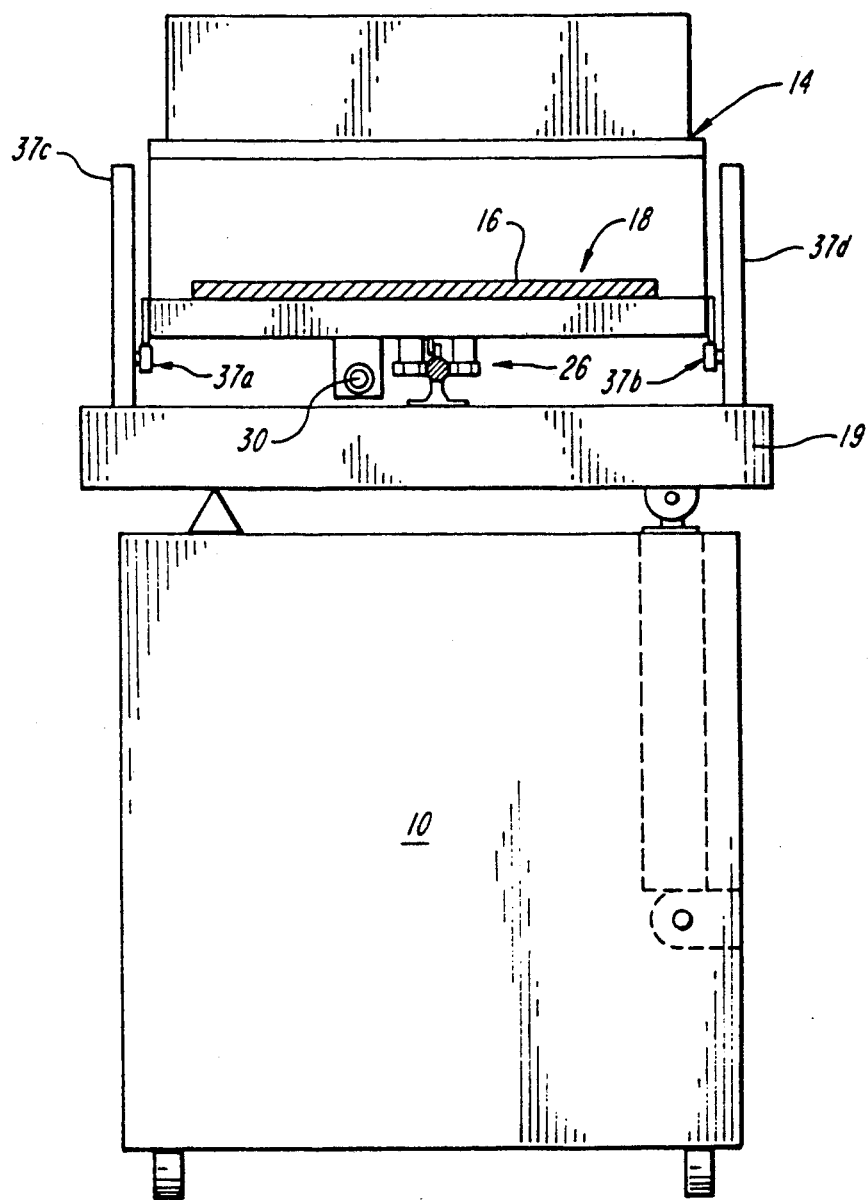
FIG. 1A is a side elevation view of the overall apparatus according to the preferred embodiment of the invention.

Referring to FIGS. 3 and 1A the moveable assembly 18 is also guided and supported in the vertical direction on each side by support bearings 34. The bearings 34 contact guide rods 37a, 37b supported by side supports 37c, 37d of table base 19.

Figure 4:
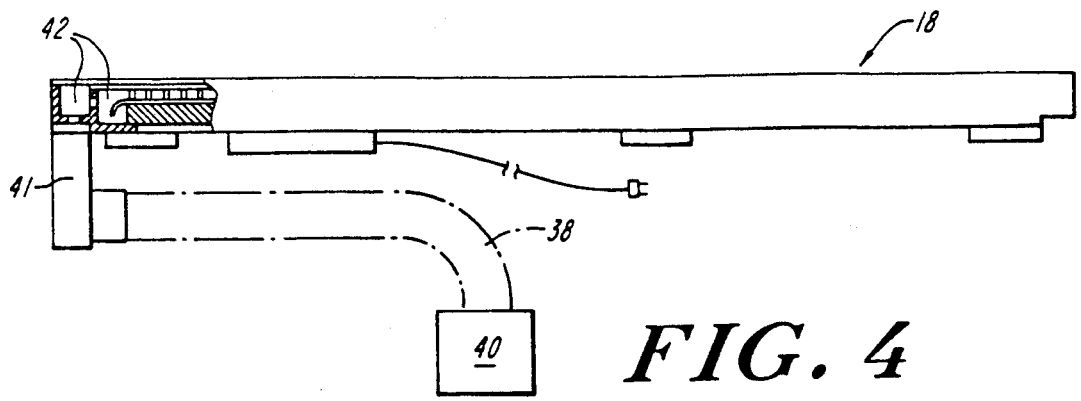
FIG. 4 is a side elevation view showing the vacuum connection to the document platen assembly.
Figure 5:
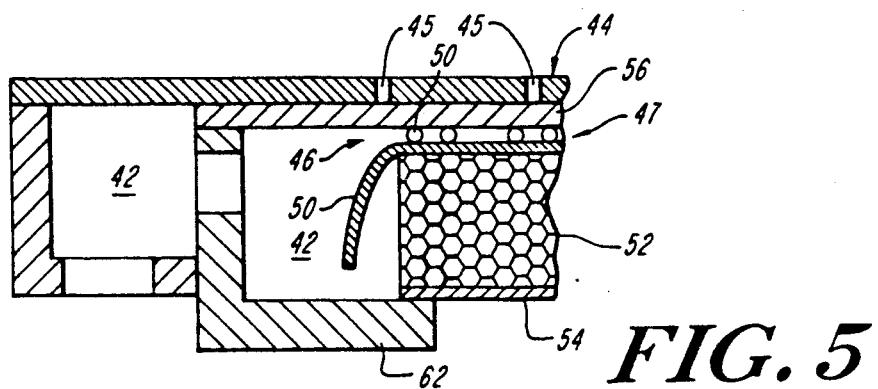
FIG. 5 is a side cross-sectional view showing the vacuum end of the document platen assembly.
Figure 6:
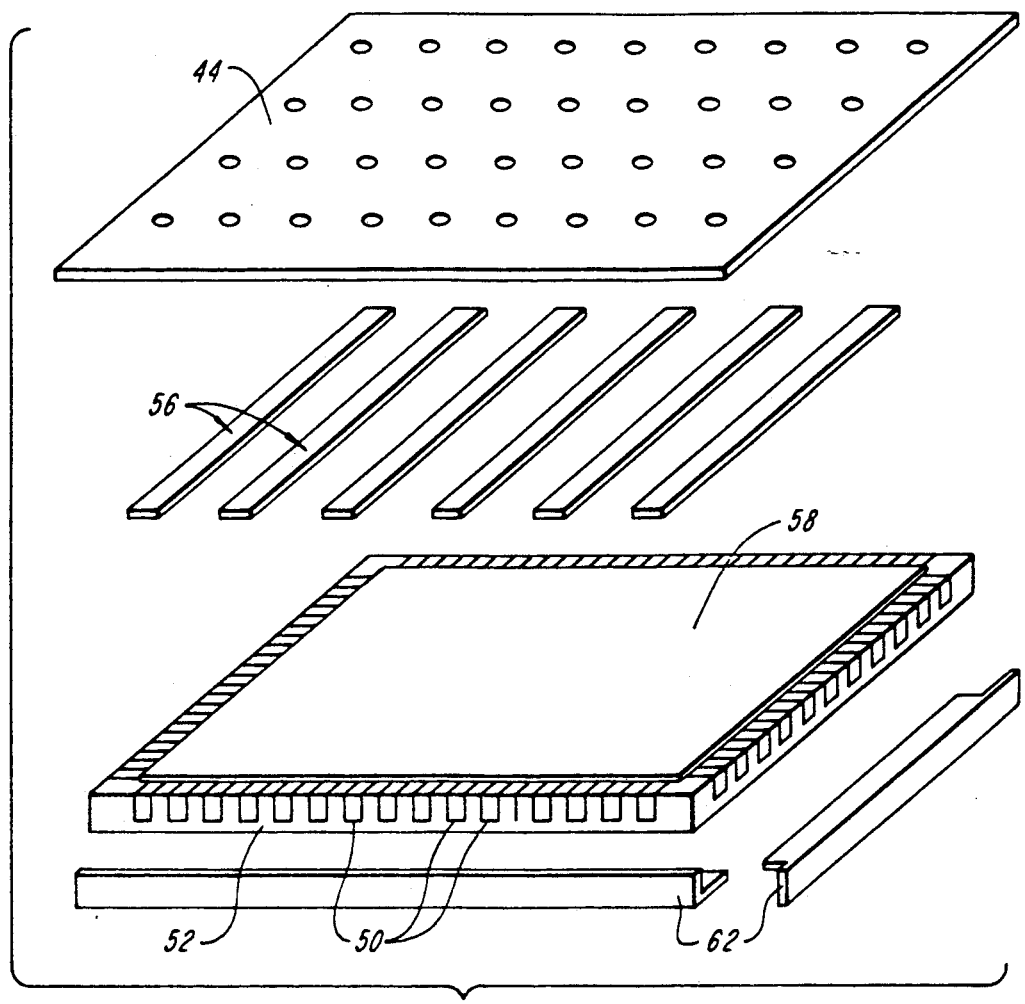
FIG. 6 is an exploded view of the document platen assembly.

Referring to FIG. 4, a vacuum connection 38, is attached to a vacuum pump 40 at one end, and vacuum connector 41 which is in fluid communication with two vacuum channels 42 at an end of assembly 18. FIGS. 5 and 6 shows the vacuum system in more detail. The document is held in place on a perforated top plate 44 of the moveable assembly by suction created at holes 45 through which air is drawn into a vacuum chamber formed between the bottom surface of the top plate and the digitizer structure 47. FIG. 6 shows the perforated top plate 44, a plurality of spacer strips 56, and a digitizer wire grid 50. A protective sheet 58 covers the wire grid 50. A nonmetallic base 52 supports the wire grid 50 and the protective sheet 58. The nonmetallic base 52 is surrounded by a supporting aluminum extrusion edging structure 62.

Vacuum chamber 46 is connected to vacuum channels 42, which are separated from each other by an angle 62 which contains evenly distributed holes, for example six. As noted above, vacuum channels 42 are attached to the vacuum connection 38 of FIG. 4.

Again referring to FIG. 5, the digitizer pad is a wire grid 50, such as that commercially available from Numonics Corp. The wires of the grid cross at right angles. Nonmetallic base 52 separates the digitizer pad 50 from a supporting steel plate 54. Perforated top plate 44 is separated from the wire grid of digitizer pad 50 by a plurality of parallel, spaced, spacer strips 56, as shown in further detail in FIG. 6.

Figure 7:
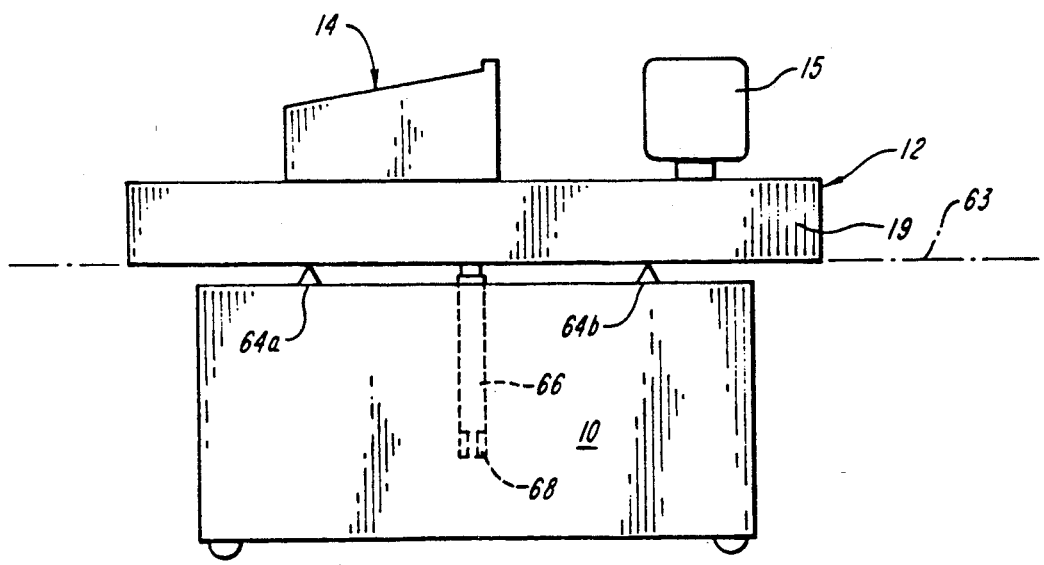
FIG. 7 is a side elevation view of the overall configuration of a preferred embodiment of the invention showing the table assembly in a horizontal position.
Figure 7A:
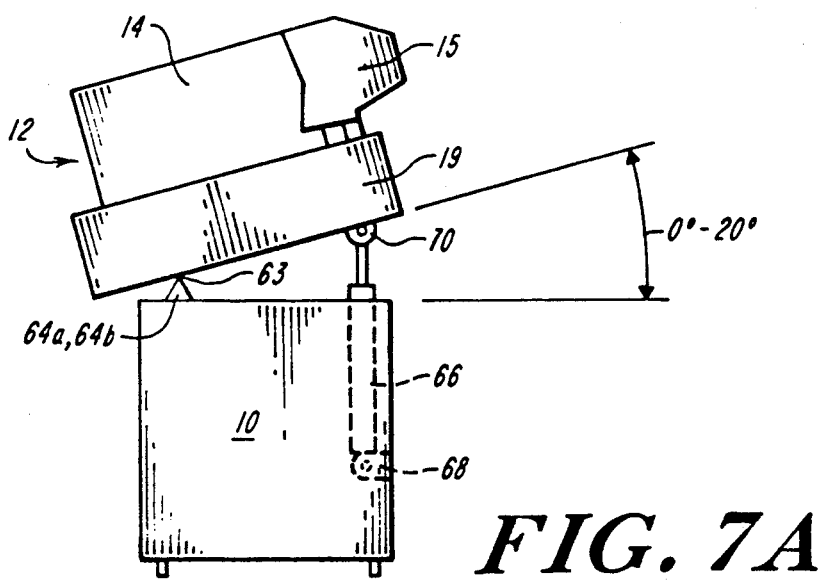
FIG. 7A shows the configuration of FIG. 7 with the table assembly at an angle to the horizontal.

As described above, perforated top plate 44 holds documents up to 18" wide. In the preferred embodiment of the invention, a cross-hair device is slid over and in contact with the document 16. Since the cross-hairs are spaced from the document surface, the angle of view can adversely affect the precision of the marking device. Preferably, the operator's view should be directly over the cross-hairs. When an operator selects points on the far side of a document from the near side of the table, it is difficult and/or impractical to view the document in this ideal manner. According to the invention, therefore, table assembly 12, which supports the digitizer and the document to be scanned as well as the scanning optics assembly and the control console, is designed to rotate toward the operator about a pivot axis 63. Referring to FIG. 7, pivot connections at pivot points 64a and 64b allow the table to be rotated about the fixed axis 63. In the illustrated embodiment, referring to FIG. 7A, a linear actuator 66 lifts one side of the table opposite pivot points 64a, 64b to an angle of between 0°–20°. Linear actuator 66 is supported by base 10 at 68 and hingedly connects to table assembly 12 at 70. The degree of rotation is determined under operator control. Thereafter, the operator can precisely locate the points of interest anywhere on the document without parallax error.

Additions, subtractions, deletions, and other modifications of the claimed invention will be apparent to those practiced in the art and are within the scope of the following claims.

What is claimed is:

1. Apparatus for scanning a document comprising
a table base, a table assembly supporting a scanning optics, and a movable document holding platen assembly,
means for translating said platen assembly past said scanning optics,
means integral with said table assembly for recording electrically determined precise two dimensional coordinate positions of documents supported by said assembly, and
means for rotating said table assembly about a pivot axis to an angle relative to said table base and holding said table assembly at said angle for avoiding parallax error in recording electrically determined precise two dimensional coordinate positions of documents supported by said assembly.

2. The scanning apparatus of claim 1 wherein said rotating means comprise a linear actuator supported by said table base and hingedly connected to said table assembly.

* * * * *